United States Patent
Cho

(10) Patent No.: US 9,989,149 B2
(45) Date of Patent: Jun. 5, 2018

(54) SHIFT CONTROL METHOD FOR VEHICLE WITH DUAL CLUTCH TRANSMISSION

(71) Applicant: HYUNDAI MOTOR COMPANY, Seoul (KR)

(72) Inventor: Sung Hyun Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/083,054

(22) Filed: Mar. 28, 2016

(65) Prior Publication Data

US 2017/0122431 A1 May 4, 2017

(30) Foreign Application Priority Data

Oct. 28, 2015 (KR) .................... 10-2015-0150047

(51) Int. Cl.
| | |
|---|---|
| *F16H 59/56* | (2006.01) |
| *F16H 61/688* | (2006.01) |
| *F16H 61/12* | (2010.01) |
| *F16H 61/02* | (2006.01) |
| *F16H 59/20* | (2006.01) |

(52) U.S. Cl.
CPC ............ *F16H 61/12* (2013.01); *F16H 59/56* (2013.01); *F16H 61/0213* (2013.01); *F16H 61/688* (2013.01); *F16H 59/20* (2013.01); *F16H 2061/0223* (2013.01); *F16H 2061/0244* (2013.01); *F16H 2061/128* (2013.01)

(58) Field of Classification Search
CPC ...... F16H 59/56; F16H 61/12; F16H 61/0213; F16H 61/688; F16H 2061/0244; F16H 2061/128
See application file for complete search history.

(56) References Cited

U.S. PATENT DOCUMENTS

| | | | |
|---|---|---|---|
| 2006/0122031 A1 | 6/2006 | Preisner et al. | |
| 2009/0264254 A1* | 10/2009 | Jaeggle | F16H 61/12 477/177 |
| 2009/0265068 A1* | 10/2009 | Kamioka | F16D 48/064 701/67 |
| 2011/0238276 A1* | 9/2011 | Tsujimura | F16D 48/08 701/68 |

(Continued)

FOREIGN PATENT DOCUMENTS

| | | |
|---|---|---|
| JP | 2009-121374 A | 6/2009 |
| JP | 2011-207254 A | 10/2011 |
| JP | 2013-047532 A | 3/2013 |

(Continued)

*Primary Examiner* — Huan Le
(74) *Attorney, Agent, or Firm* — McDermott Will & Emery LLP

(57) ABSTRACT

A shift control method for a vehicle with a Dual Clutch Transmission (DCT) includes comparing, by a controller, a current clutch temperature with a first predetermined reference value and a second predetermined reference value, the second predetermined reference value being greater than the first reference value, preventing, by the controller, coaxial power-on downshifting when the clutch temperature is greater than the first reference value, and reducing, by the controller, a shift time by preventing coaxial power-on downshifting when the clutch temperature is greater than the second reference value and then increasing a shift speed when biaxial full skip shifting is required.

4 Claims, 2 Drawing Sheets

(56) References Cited

U.S. PATENT DOCUMENTS

2015/0112561 A1* 4/2015 Satoyoshi ........... F16H 61/0213
  701/65
2015/0183415 A1 7/2015 Moon et al.

FOREIGN PATENT DOCUMENTS

| JP | 2013-050130 A | 3/2013 |
| JP | 2013-079675 A | 5/2013 |
| KR | 10-2011-0105636 A | 9/2011 |
| KR | 10-1396259 B1 | 5/2014 |
| KR | 10-2015-0071119 A | 6/2015 |

* cited by examiner

SHIFT CONTROL METHOD FOR VEHICLE WITH DUAL CLUTCH TRANSMISSION

CROSS-REFERENCE TO RELATED APPLICATION

This application claims the benefit of priority to Korean Patent Application No. 10-2015-0150047, filed on Oct. 28, 2015 with the Korean Intellectual Property Office, the disclosure of which is incorporated herein by reference.

TECHNICAL FIELD

The present disclosure relates to a shift control method for a vehicle with a Dual Clutch Transmission (DCT), and more particularly, to a shift control method for a vehicle equipped with a DCT in a power-on downshift situation in which shifting to a lower gear is performed when the driver steps on an accelerator pedal.

BACKGROUND

DCTs are broadly divided into one type using wet clutches and one type using dry clutches. Cooling of such a wet clutch is generally performed using oil, whereas cooling of such a dry clutch generally depends on air cooling, and thus the dry clutch can be vulnerable to overheating.

In particular, the generation of heat from the dry clutch used in the DCT is problematic in the case of continuous creeping or unintended accelerations when driving uphill and in the case of repeated power-on downshifting by the driver.

The matter disclosed in this section is merely for enhancement of understanding of the general background of the disclosure and should not be taken as an acknowledgment or any form of suggestion that the matters form the related art already known to a person skilled in the art.

SUMMARY OF THE DISCLOSURE

Therefore, the present disclosure has been made in view of the above problems, and it is an object of the present disclosure to provide a shift control method for a vehicle with a DCT, which minimizes the generation of heat from a dry clutch provided in a DCT in a power-on downshift situation, which occurs when the driver steps on an accelerator pedal, thereby enhancing the durability of the clutch.

In accordance with the present disclosure, the above and other objects can be accomplished by the provision of a shift control method for a vehicle with a Dual Clutch Transmission (DCT), the method including comparing, by a controller, a current clutch temperature with a first predetermined reference value and a second predetermined reference value, the second predetermined reference value being greater than the first reference value, preventing, by the controller, coaxial power-on downshifting when the clutch temperature is greater than the first reference value, and reducing, by the controller, a shift time by preventing coaxial power-on downshifting when the clutch temperature is greater than the second reference value and then increasing a shift speed when biaxial full skip shifting is required.

The first reference value may be set to a temperature at which there is a risk of overheating of a clutch when coaxial power-on downshifting occurs, whereby it is necessary to prevent the overheating, and the second reference value, which is greater than the first reference value, may be set to a temperature at which the overheating of the clutch is more problematic than a deterioration in a shifting feeling in the case of biaxial full skip downshifting as well as coaxial power-on downshifting.

The step of reducing a shift time may include reducing a torque of a release-side clutch by the controller, so as to increase a target engine-speed change rate beyond a reference engine-speed change rate.

The step of reducing a shift time may include increasing an operating force of a synchro-mechanism beyond a reference operating force by the controller when the synchro-mechanism is engaged with a target gear.

The step of reducing a shift time may include controlling clutches by the controller so that a torque handover time becomes shorter than a reference time when engagement between the synchro-mechanism and the target gear is completed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
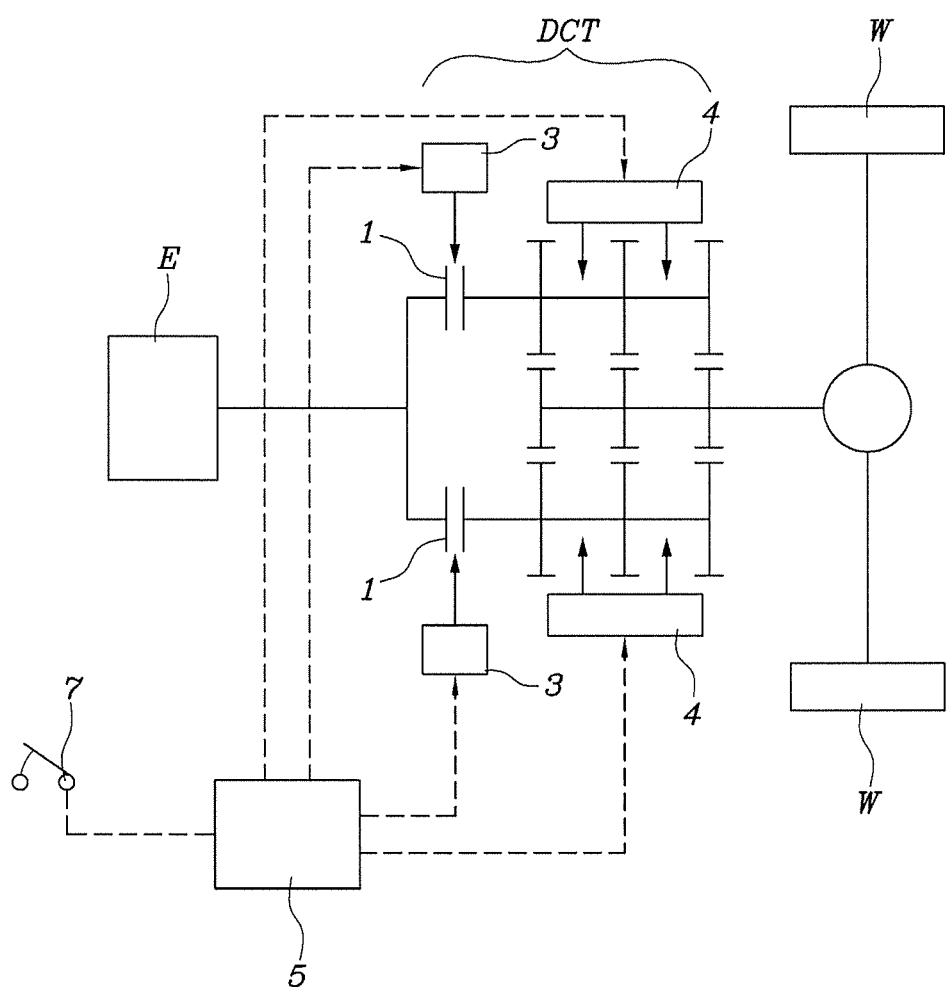
FIG. 1 is a schematic view illustrating a vehicle with a DCT according to the present disclosure.

Referring to FIG. 1, in the configuration of a vehicle with a Dual Clutch Transmission (DCT), the power of an engine E may be provided to drive wheels W via the DCT, two clutches 1 constituting the DCT may be controlled by respective clutch actuators 3 and gears that form respective shift stages may be shifted by shift actuators 4 that selectively drive synchro-mechanisms. All of the clutch actuators 3 and the shift actuators 4 may be controlled by a controller 5, and the controller 5 may be adapted to receive a signal from an Accelerator Position Sensor (APS) 7 in order to receive information regarding the extent to which an accelerator pedal is depressed.

The controller 5 is adapted to receive information including, for example, engine torque and engine speed, in addition to the aforementioned information.

Here, the term "controller" refers to a transmission controller that controls a transmission such as, for example, the DCT, if no additional prefix is provided, and a controller for controlling the engine is referred to as an "engine controller" for differentiation.

Figure 2:
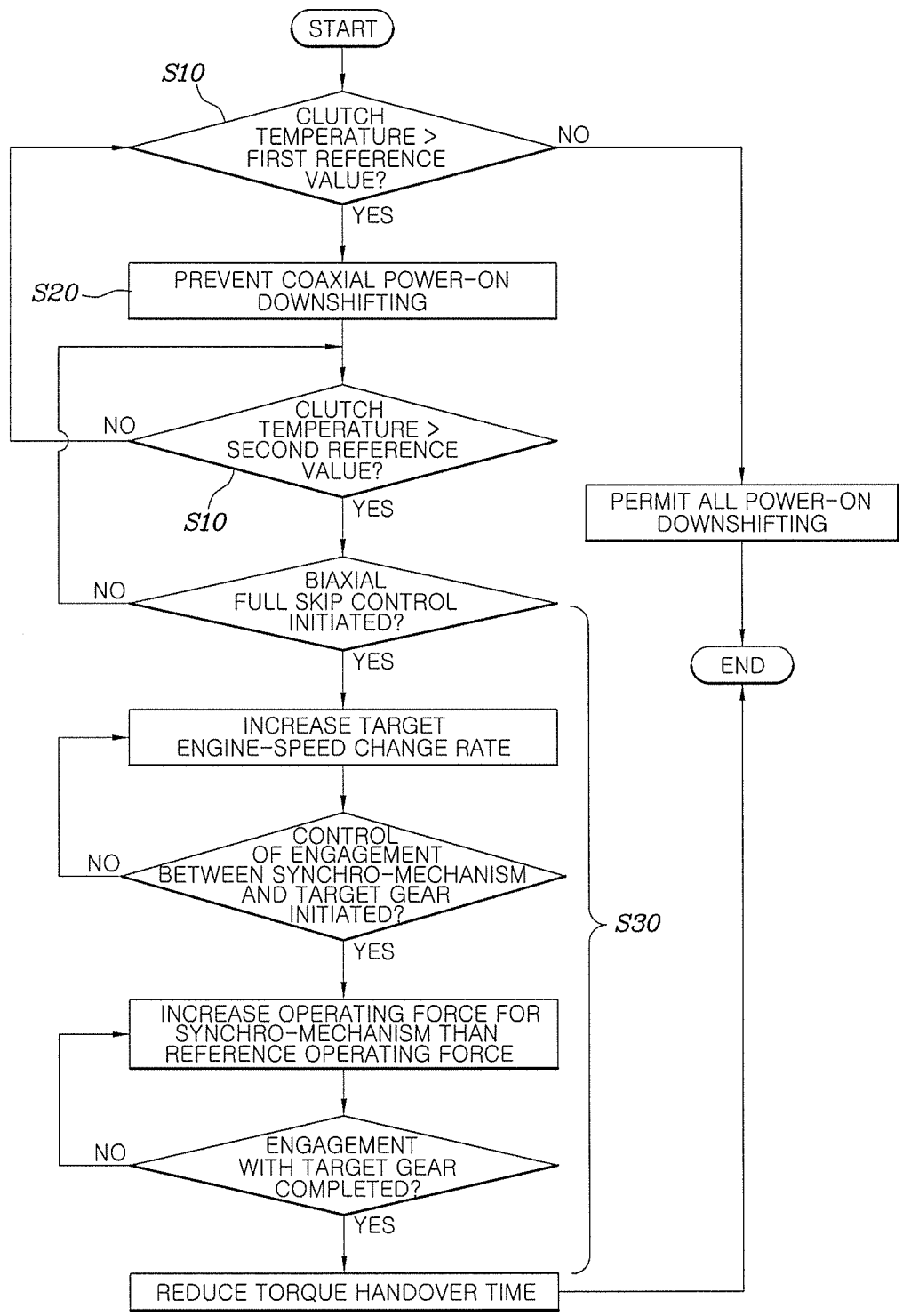
FIG. 2 is a flowchart illustrating an exemplary embodiment of a shift control method for a vehicle with a DCT according to the present disclosure.

Referring to FIG. 2, in an embodiment of the present disclosure, a shift control method for the vehicle with the DCT includes a temperature comparison step S10 in which the controller 5 compares the current clutch temperature with a first predetermined reference value and a second predetermined reference value, which is greater than the first reference value, a shift-limiting step S20 in which the controller 5 prevents coaxial power-on downshifting when the clutch temperature is greater than the first reference value, and a shift time shortening sequence S30 in which the controller 5 prevents coaxial power-on downshifting when the clutch temperature is greater than the second reference value, and then increases a shift speed when biaxial full skip shifting is required.

That is, in the present embodiment, when the clutch temperature of the DCT exceeds the first reference value, the clutch is assumed to be overheating, and coaxial power-on downshifting is prevented. When the clutch temperature exceeds the second reference value as well, in addition to preventing coaxial power-on downshifting, the shift speed is increased during biaxial full skip shifting, so as to reduce the load applied to the clutch. In this way, an increase in the clutch temperature may be restricted.

General shift control, in which all downshifting including coaxial power-on downshifting is permitted, is performed when the clutch temperature is equal to or less than the first reference value.

For reference, although the clutch temperature may be acquired via a temperature sensor that directly measures the temperature of the clutch, a clutch temperature estimation value, which may be estimated by the controller based on various vehicle information, which may include the operation history of the clutch and the state of the clutch, may be used.

The two clutches of the DCT are respectively connected to two input shafts, and implementable shift gears are assigned to the respective input shafts. For example, odd shift gears, namely a first gear, third gear and fifth gear are assigned to a first input shaft connected to a first clutch, and even shift gears, namely, a second gear, fourth gear and sixth gear are assigned to a second input shaft connected to a second clutch. With regard to the DCT described above, "coaxial power-on downshift" refers to the case where shifting is performed to shift to a lower gear located on the same shaft when the driver steps on the accelerator pedal. For example, in the case of the DCT described above, "coaxial power-on downshift" refers to the case where shifting is performed from the fifth gear to the third gear when the driver steps on the accelerator pedal.

In this case, the first clutch, which is connected to the first input shaft, to which both the third gear and the fifth gear are assigned, is continuously loaded before and after shifting as well as during shifting, and thus may further increase in temperature. Therefore, when it is judged that the temperature of the clutch is equal to or greater than the first reference value, coaxial power-on downshifting is prevented so as to prevent additional increases in the temperature of the clutch.

Accordingly, to meet the intent described above, the first reference value may be set to a value at which it is judged that the probability of deterioration in the durability of the clutch is high when coaxial power-on downshifting occurs because the temperature of the clutch is higher than usual. This value may be determined through repeated experimentation and analysis for respective vehicle models, and may be set to, for example, 270° C.

The term "biaxial full skip shift" refers to the case where the highest gear, among lower gears assigned to the other input shaft, is skipped, and shifting to the next highest gear is performed. For example, in the case of the DCT described above, shifting from the sixth gear, assigned to the second input shaft, is performed to the third gear among lower gears assigned to the first input shaft, which is different from the second input shaft, while skipping the fifth gear, which is the highest gear assigned to the first input shaft.

In the case of the DCT, the most basic shifting strategy is so-called sequential shifting in which shifting is sequentially performed to gears that are located on different input shafts as a vehicle is accelerated or decelerated. For example, in the case of the DCT described above, shifting may be sequentially performed to upper gears in the order of the first gear, second gear, third gear, fourth gear, fifth gear and sixth gear, or may be sequentially performed to lower gears in order of the sixth gear, fifth gear, fourth gear, third gear, second gear and first gear.

Accordingly, "biaxial shifting", which indicates that shifting is performed to gears located on different shafts in the DCT, is the basic shifting strategy, and must be permitted if possible even if the temperature of the clutch is high. In the present disclosure, biaxial shifting is fundamentally permitted. Therefore, in case of preventing coaxial power-on downshifting, the biaxial shifting could be performed instead. However, in the case of biaxial full skip shifting, described above, it seldom occurs during vehicle driving, and only rarely occurs when the driver suddenly steps on the accelerator pedal. Thus, in this case, since the load that the clutches need to bear is increased compared to that in the case of general shifting, biaxial full skip shifting is intended to shorten the shift time even though shifting is permitted, in order to minimize an increase in the temperature of the clutch.

When the duration of biaxial full skip shifting is reduced compared to the general case, in which the temperature of the clutch is equal to or less than the second reference value, a deterioration in the shifting feeling, such as an occurrence of shift shocks, is caused. However, despite this problem, biaxial full skip shifting is performed in order to protect the clutch. For reference, in the present disclosure, biaxial full skip shifting may be power-on biaxial full skip shifting, in which shifting is substantially performed when the driver steps on the accelerator pedal.

Accordingly, to meet the intent described above, the second reference value must be set to a temperature, which is higher than the first reference value, at which the shift time needs to be reduced to protect the clutch despite the deterioration in a shifting feeling caused by biaxial full skip shifting. This may be determined through repeated experimentation and analysis for respective vehicle models, and may be set to, for example, 300° C.

In summary, the first reference value may be set to a temperature at which it is judged that there is a risk of the clutch overheating when coaxial power-on downshifting occurs, making it is necessary to prevent the overheating of the clutch. The second reference value is set to a temperature which is greater than the first reference value, and at which it is judged that the overheating of the clutch is more problematic than the deterioration in shifting feeling in the case of biaxial full skip downshifting as well as coaxial power-on downshifting.

In the shift time shortening step, a method of reducing the torque of the release-side clutch to increase target engine-speed change rate beyond a reference engine-speed change rate is used.

In the case where the temperature of the clutch in a corresponding vehicle is equal to or less than the second reference value, and general shifting for other cases, excluding the shift control situation of the present disclosure for protection of the clutch, is performed, "reference engine-speed change rate" refers to an engine-speed change rate that is set to ensure that the engine speed reaches a target synchronization speed, which is calculated at the time at which shifting begins, as soon as possible within a range that does not cause shift shocks. Here, the reference engine-speed change rate is acquired in relation to an initial slip amount, which is the difference between the engine speed and the target synchronization speed.

That is, when biaxial full skip shifting occurs in the state in which the temperature of the clutch is equal to or less than the second reference value, the controller acquires the reference engine-speed change rate depending on the current initial slip amount from the map, which shows the relationship of the reference engine-speed change rate and the initial slip amount. Then, the controller performs feedback control to reduce the torque of the release-side clutch so as to increase the engine speed based on the acquired reference engine-speed change rate. In the state in which the temperature of the clutch exceeds the second reference value as in the present disclosure, by acquiring the reference engine-speed change rate depending on the current initial slip amount from the map, which shows the relationship of the reference engine-speed change rate and the initial slip amount, and thereafter acquiring a target engine-speed change rate that is greater than the reference engine-speed change rate, the controller may reduce the torque of the release-side clutch so as to increase the engine speed based on the acquired target engine-speed change rate.

Here, as a method of acquiring the target engine-speed change rate from the reference engine-speed change rate, the reference engine-speed change rate may be multiplied by a constant within a range of 1.2 to 1.5, in order to calculate the target engine-speed change rate.

In the general case, rather than the case of performing the shift time shortening step, the constant by which the reference engine-speed change rate is multiplied may be 1, and the target engine-speed change rate may be the same as the reference engine-speed change rate.

The shift time shortening step serves to increase the operating force of the synchro-mechanism beyond a reference operating force when a target shift gear is engaged with the synchro-mechanism.

That is, in order to reduce the shift time, when engaging the synchro-mechanism with a target gear by actuating the synchro-mechanism using the shift actuator, the controller may increase the operating force required to actuate the synchro-mechanism using the shift actuator beyond a reference operating force, thereby causing shifting.

Generally, the reference operating force, required for the shift actuator to drive the synchro-mechanism, is set to a constant value depending on the corresponding transmission. When the implementation of the shift time shortening step is required, the controller controls the shift actuator such that the synchro-mechanism is engaged with the target gear by an operating force that is acquired by multiplying the reference operating force by a constant that is greater than 1. For example, when a reference operating force for a corresponding DCT is set to 100 N, in the shift time shortening step, the reference operating force is multiplied by 1.5 so that the synchro-mechanism is driven by a force of 150N, which enables more rapid shifting.

In addition, in the shift time shortening step, when the synchro-mechanism is completely engaged with the target gear, the clutches are controlled so that torque handover time becomes shorter than a reference time.

In the case of a general shift situation, the torque handover time is determined by the map of the initial slip amount, which is the difference between the engine speed and the target synchronization speed, which is calculated at the time at which shifting begins. Thus, upon shifting, the torque handover time corresponding to the currently calculated initial slip amount is acquired from the map, and a torque phase subsequent to an inertia phase, in which the engine speed reaches the target synchronization speed, is performed during the acquired torque handover time. In the state in which the shift time shortening step is performed, the torque handover time, acquired from the map, is multiplied by a constant that is less than 1 so that a shorter time is assigned to the torque phase, which may reduce the torque of the release-side clutch within a shorter time and increase the torque of the coupling-side clutch within a shorter time, thereby shortening the overall shifting time and preventing an increase in temperature thanks to the reduction in the load applied to the clutches.

As is apparent from the above description, according to the present disclosure, in the case of a vehicle having a DCT equipped with dry clutches, the generation of heat from the dry clutches may be minimized in a power-on downshift situation, which occurs when the driver steps on an accelerator pedal, thereby enhancing the durability of the clutches.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A shift control method for a vehicle with a Dual Clutch Transmission (DCT), the method comprising:
    comparing, by a controller, a temperature of a coupling-side clutch with a first predetermined reference value and a second predetermined reference value, the second predetermined reference value being greater than the first predetermined reference value;
    preventing, by the controller, coaxial power-on downshifting when the temperature of the coupling-side clutch is greater than the first predetermined reference value; and
    reducing, by the controller, a shift time by preventing coaxial power-on downshifting when the temperature of the coupling-side clutch is greater than the second predetermined reference value and then increasing a shift speed when biaxial full skip shifting is required.

2. The method according to claim 1, wherein the step of reducing the shift time includes reducing a torque of a release-side clutch by the controller, so as to increase a target engine-speed change rate beyond a reference engine-speed change rate.

3. The method according to claim 2, wherein the step of reducing the shift time includes increasing an operating force of a synchro-mechanism beyond a reference operating force by the controller when the synchro-mechanism is engaged with a target gear.

4. The method according to claim 3, wherein the step of reducing the shift time includes controlling the clutch clutches by the controller so that a torque handover time becomes shorter than a reference time when engagement between the synchro-mechanism and the target gear is completed.

* * * * *